H. Miller.

Paint Cans.

No. 3,993, Reissued May 24. 1870.

Witnesses,
Theo Tusch
Wm. J. McNamara

Inventor,
Herman Miller

United States Patent Office.

THE DEVOE MANUFACTURING COMPANY, OF NEW YORK, N. Y., ASSIGNEES OF HERMAN MILLER.

*Letters Patent No.* 43,326, *dated June* 28, 1864; *reissue No.* 3,993, *dated May* 24, 1870.

IMPROVEMENT IN CANS FOR PAINT, FRUIT, &c.

The Schedule referred to in these Letters Patent and making part of the same.

*To all whom it may concern:*

Be it known that HERMAN MILLER, of Hoboken, in the county of Hudson and State of New Jersey, has invented a new and useful Improvement in Paint and other Cans; and the following is hereby declared to be a full, clear, and exact description thereof, which will enable those skilled in the art to make and use the same, reference being had to the accompanying drawings making part of this specification, in which—

The improved can herein described is intended for the reception of paint, and other substances of a heavy nature, which require that the package in which they are put up shall be strong and durable, but it may also be employed for the reception of fruit, and substances of every description.

The cans here shown are to be usually made of ordinary sheet tin, but any other suitable metal may be employed.

The object of this invention is to impart increased strength and stiffness to the can, and also to facilitate the soldering of the edges or joints of the sheets of tin where they lap; also, to promote the tight sealing of the joints, thereby preventing leakage.

A is the top of an angular or "square" can, formed of a single sheet of tin with an orifice, *a*, through which the paint or other substance is introduced.

B B are the sides of the can, each of which sides is composed of a single plate or sheet, and having a groove, *b*, which is called the "solder groove," sunk in the sheet, near the edges thereof.

Figure 2:
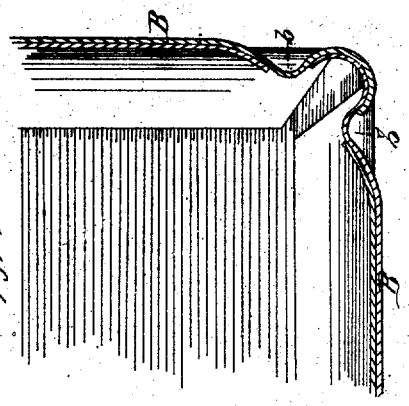
Figure 1:
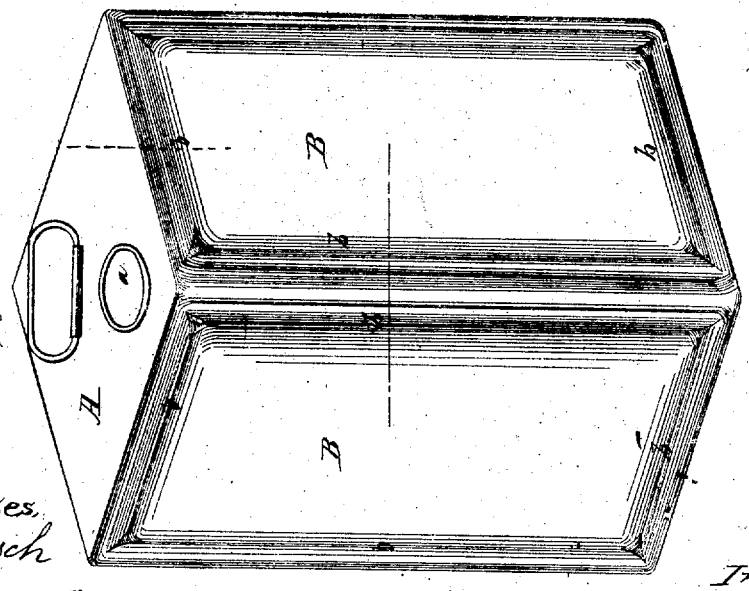
Figure 1 is a perspective view of a complete can, made in accordance with this invention.

The overlapping edges are rounded to a semi-cylindrical form, more or less, and fit one over the other, as shown in fig. 2, the edge of the outer sheet terminating within the groove *b* of the contiguous sheet.

This mode of constructing and uniting the sides imparts a semi-tubular or pillar-like form to the upright edges of the can, which gives to the can increased strength, and, at the same time, a finished and ornamental appearance.

The groove *b* serves as a guide to the point of the workman's soldering tool, and the groove also holds the solder in place before it becomes heated, and, likewise, concentrates the molten solder upon the joint, and prevents it from running away from the joint, so that the joint will be sealed with certainty.

In the ordinary cans the edges of the sheets are simply bent one over the other, at right angles, and then soldered, but it is difficult for the workman to keep the solder upon the joint, as the exterior surface of the can at the joint is flat, and the solder runs from the joint, and spreads upon the outside of the can, and also slips through between the flat edges of the joints, and thus escapes, resulting, often, in leakages unperceived by the workman at the time of soldering.

Figure 3:
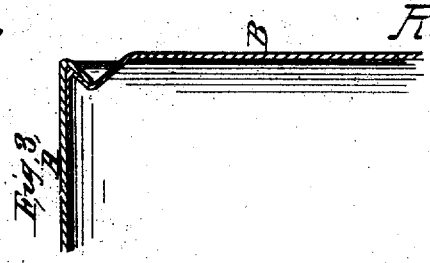
Figures 2 and 3 are sectional views of parts of the edges of a can thus made.

The plates which form the top and bottom of the cans are bent over, so as to rest in the solder groove *b*, as shown in the drawing, fig. 3.

The edges or flanges of the top and bottom plates are not notched or cut at the points where they are bent over the corners of the can, as has been heretofore customary and necessary in making "square" or angular sheet-metal cans, but they are undivided throughout their entire length, and, in that state, are bent over the sides and corners and united with the body of the can, thus giving a stronger joint at the corners, with less liability of leakage than would be the case were they divided at those points.

Another important advantage of this improvement is that, by the use of the solder-grooves *b*, the edges of the can are greatly strengthened, owing to the stiffness imparted by the corrugation of the edges of the plates in the formation of the said grooves.

Thus all the edges of the can are rounded and strengthened, and a general stability is imparted to the can, while the soldering is more quickly done, with greater certainty of preventing leakage, and with a less amount of solder, because the grooves *b* catch and hold the solder, preventing loss of the same.

What is claimed as the invention of the said HERMAN MILLER is as follows:

1. A can composed of plates provided with solder grooves, the plates between said grooves being united by lap-joint, so as to form double-plated corners or edges, substantially as and for the purposes set forth.

2. The semi-tubular or pillar-like formation of the edges of the can, substantially as and for the purposes shown and set forth.

3. A can, the round-cornered body of which is united with the top or bottom by means of an undivided turn-down flange, as herein shown and described.

In testimony whereof I, FREDK. W. DEVOE, secretary of the Devoe Manufacturing Company, have hereunto signed my name, and affixed the seal of said company, in the presence of two subscribing witnesses.

F. W. DEVOE, [L. S.]
*Secretary Devoe Manufacturing Company.*

Witnesses:
J. C. MCKAY,
J. H. LOUNSBREY.